United States Patent [19]

Strelow

[11] Patent Number: 4,669,500
[45] Date of Patent: Jun. 2, 1987

[54] CHECK VALVE ACTUATOR

[75] Inventor: John L. Strelow, Broken Arrow, Okla.

[73] Assignee: Wheatley Pump and Valve, Inc., Tulsa, Okla.

[21] Appl. No.: 866,405

[22] Filed: May 23, 1986

[51] Int. Cl.⁴ .............................................. F16K 15/18
[52] U.S. Cl. ................... 137/514; 137/522; 137/523; 137/527; 137/553; 137/559; 251/43
[58] Field of Search ............... 137/514, 514.7, 522, 137/523, 527, 553, 559; 251/41, 43, 112, 113

[56] References Cited

U.S. PATENT DOCUMENTS

| 1,059,037 | 4/1913 | Collar | 251/112 |
| 3,106,220 | 10/1963 | Hose | 137/514 |
| 3,177,894 | 4/1965 | Camp | 137/514 |
| 3,789,872 | 2/1974 | Elliott | 137/514 |
| 3,817,278 | 6/1974 | Elliott | 137/527 |
| 3,942,551 | 3/1976 | Schuller et al. | 137/514 |
| 4,188,973 | 2/1980 | Weise et al. | 137/514 |
| 4,593,719 | 6/1986 | Leonard | 137/625.66 |

FOREIGN PATENT DOCUMENTS 64617 9/1892 Fed. Rep. of Germany ... 137/514.7

Primary Examiner—Gerald A. Michalsky
Attorney, Agent, or Firm—Arnold, White & Durkee

[57] ABSTRACT

The invention disclosed herein relates to a check valve actuator for opening and closing a check valve, utilizing system pressure. The check valve actuator is comprised of a piston connected to a clapper assembly by a connecting rod. The piston is slideably received in a piston cylinder containing a control valve and a latching stem. A protective cage and a protective cover are mounted over the piston cylinder.

21 Claims, 4 Drawing Figures

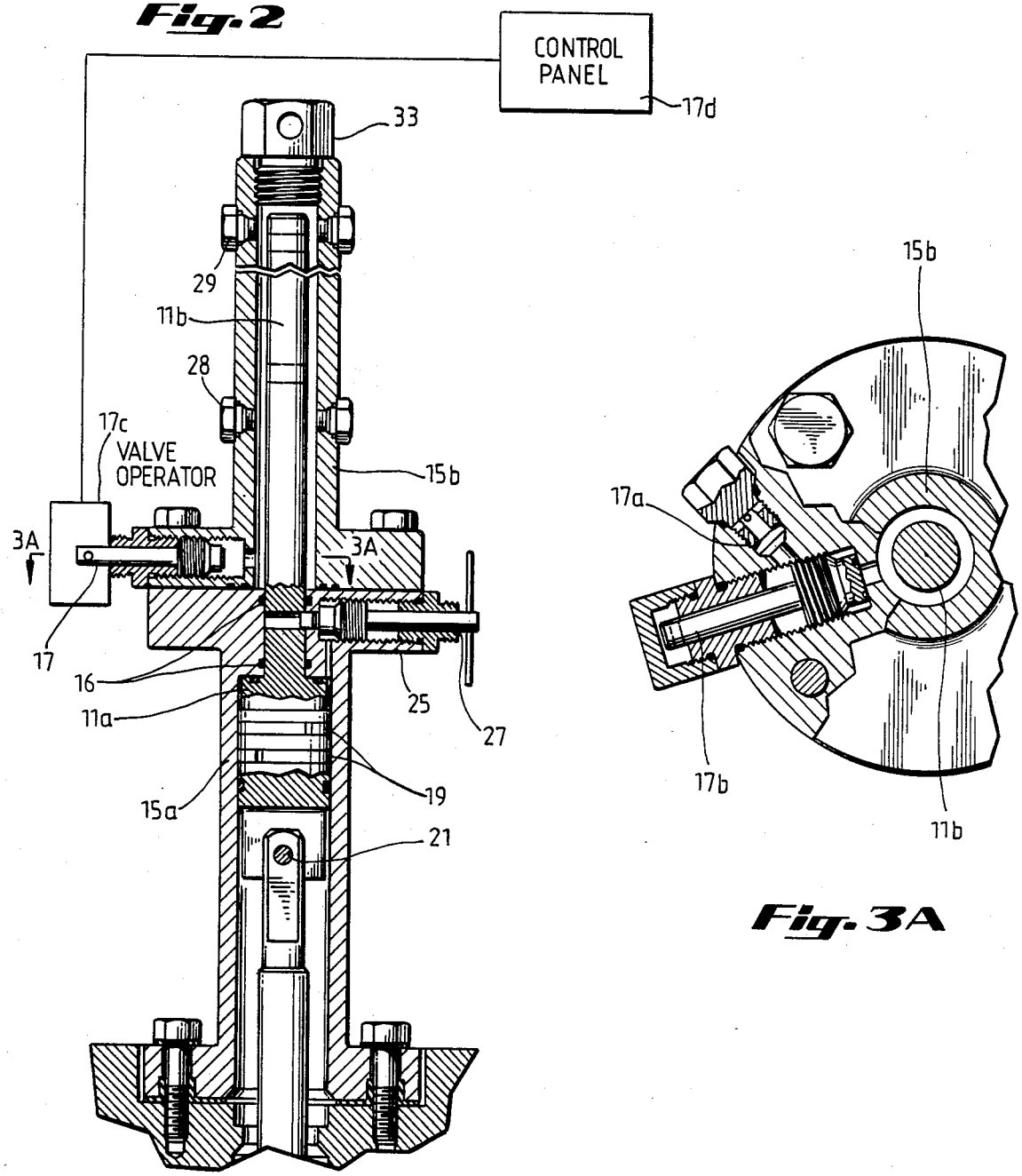

CHECK VALVE ACTUATOR

BACKGROUND OF THE INVENTION

1. Field of the Invention

The present invention relates to a swing-type check valve for use in pipelines. The invention, more particularly, concerns a check valve in combination with a piston/cylinder assembly for actuating the valve. The valve has particular applications in submerged pipelines where it simplifies tasks such as pigging.

2. Description of the Prior Art

The most common type of check valve is a swing check valve consisting of a hinged clapper assembly mounted inside a pipeline. The clapper assembly generally includes a clapper valve and a clapper arm which suspends the clapper valve from the valve body. When there is no flow in the pipeline, the clapper valve portion of the assembly hangs vertically suspended, in the closed position. As fluid flows through the pipeline in the desired direction, the fluid pressure swings the clapper valve partially open. When fluid tries to flow in the undesired direction, the reversed fluid pressure presses the check valve shut, thereby stopping such flow.

During normal pipeline maintenance operations, there are times when it is desirable to hold a check valve completely open. A typical time is when a pig is run through the pipeline. This operation is known as pigging. In conventional check valves, the clapper is suspended from a shaft whose ends extend out through the wall of the pipeline. The clapper can then be rotated from a fully-closed to a fully-open position by rotating the shaft. During pigging operations, a large wrench or other operator is placed on one end of the shaft and rotated until the clapper is fully opened.

In subsea pipelines, a highly trained diver must be sent down to open a check valve with the large wrench or other operator. This procedure is time consuming and involves a substantial degree of risk to the diver, particularly in a hostile ocean environment such as the North Atlantic.

Another drawback of conventional check valves is the fact that the large shaft from which the clapper is suspended penetrates the pipeline twice. This results in two pressure-boundary penetrations equal in size to the shaft cross-sectional area. In a pressurized system, it is highly desirable to minimize the number and area of such penetrations so as to not reduce the integrity of the pressurized system.

SUMMARY OF THE INVENTION

The present invention in a preferred form provides a means for opening and closing a check valve in a pressurized system by utilizing system pressure, itself, as the motive force to open and close the check valve. The need to manually open and close the check valve with a wrench or other external power device is thereby obviated.

In the preferred form of this invention, a piston/cylinder assembly is vertically mounted above the check valve clapper assembly. The piston is connected at its lower end to the clapper assembly by a flexible or rigid connecting device. The piston is slideably mounted inside the vertical cylinder such that up and down cycling of the piston raises and lowers the clapper assembly and thereby opens and closes the valve. A control valve is mounted in the upper section of the cylinder to regulate pressure within the cylinder above the piston. The control valve may be remotely or locally actuable, or may be remotely located.

The present invention may be used when the system pumps are running. In the nonpumping mode, the pressure differential across the clapper is essentially zero. The static pressure of the system, however, should be raised to have sufficient pressure to lift the clapper. When the system is sufficiently pressurized, the control valve is opened to allow system pressure to bleed up past the piston and to vent outside the upper portion of the cylinder. This bleeding operation causes a pressure reduction above the piston, resulting in sufficient pressure differential to swing the clapper valve assembly open. The position of the piston in the cylinder can be ascertained by local observation methods, such as peering through a sight glass, or with remote position sensing technology well known in the art.

When the clapper valve is fully open, it can be locked into position with a latching stem or other suitable device. When the control valve is closed, the bleeding process stops and the pressure differential across the piston is gradually reduced to zero. As the pressure differential across the piston decreases, the clapper valve begins to swing shut due to the force of gravity. The clapper valve can be opened and closed repeatedly, merely by cycling the control valve.

BRIEF DESCRIPTION OF THE DRAWINGS

FIG. 2 is a close-up, longitudinal, cross-sectional view of the piston/cylinder assembly.

FIGS. 3a and 3b are a top view and a full view, respectively, of preferred embodiments of the control valve.

DETAILED DESCRIPTION OF THE PREFERRED EMBODIMENTS

Figure 1:
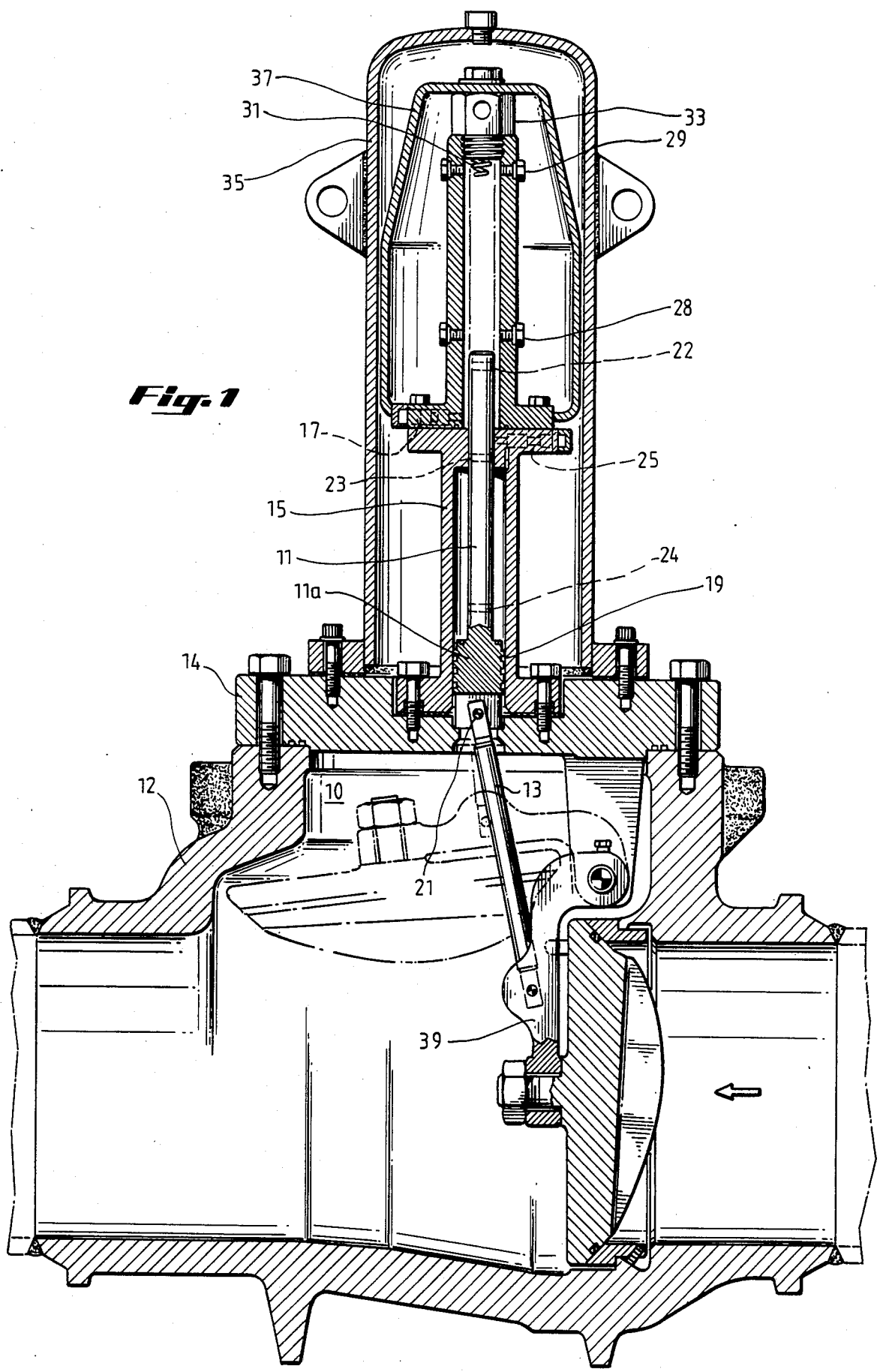
FIG. 1 is a full cross-sectional view of a clapper-type check valve assembly together with a piston/cylinder assembly for actuating the check valve.

Referring now to FIGS. 1 and 2, a clapper check valve assembly 39 is shown vertically suspended in a valve housing 10. The valve housing 10 includes a valve body 12 and a flange or cover 14. Connecting rod 13 connects clapper assembly 39 with piston 11.

Piston 11 is slideably movable in cylinder 15 with sufficient clearance to enable fluid pressure to be transmitted between the piston and the cylinder. Wear rings 19 are axially spaced on lower piston section 11a. Wear rings 16 are axially spaced on upper piston section 11b. Upper piston section 11b contains three axially spaced horizontal holes 22–24 traversing the diameter of upper piston section 11b. Upper hole 22 provides a means for piston 11 to be gripped with a manual lifting tool. The two lowers holes, 23–24, provide a means of locking the piston in place with the latching stem 27, in order to hold clapper assembly 39 in the desired position.

Referring specifically to FIG. 2, latching stem housing 25 is horizontally mounted in lower cylinder section 15a. Latching stem 27 is horizontally and movably mounted within housing 25. Sight glasses 28 and 29 may be axially spaced and horizontally mounted in holes in upper cylinder section 15b. A spring 31 may be vertically mounted in the top of upper cylinder section 15b. An actuator cap 33 is preferably threaded or otherwise removably installed in the top of upper cylinder section 15b. A protective cage 37 is preferably mounted over upper cylinder section 15b. A protective cover 35 is also preferably mounted over piston cylinder 15 and protective cage 37. valve 17 may be remotely actuated from control panel 17d which is electrically coupled to valve operator 17c.

Figure 3B:
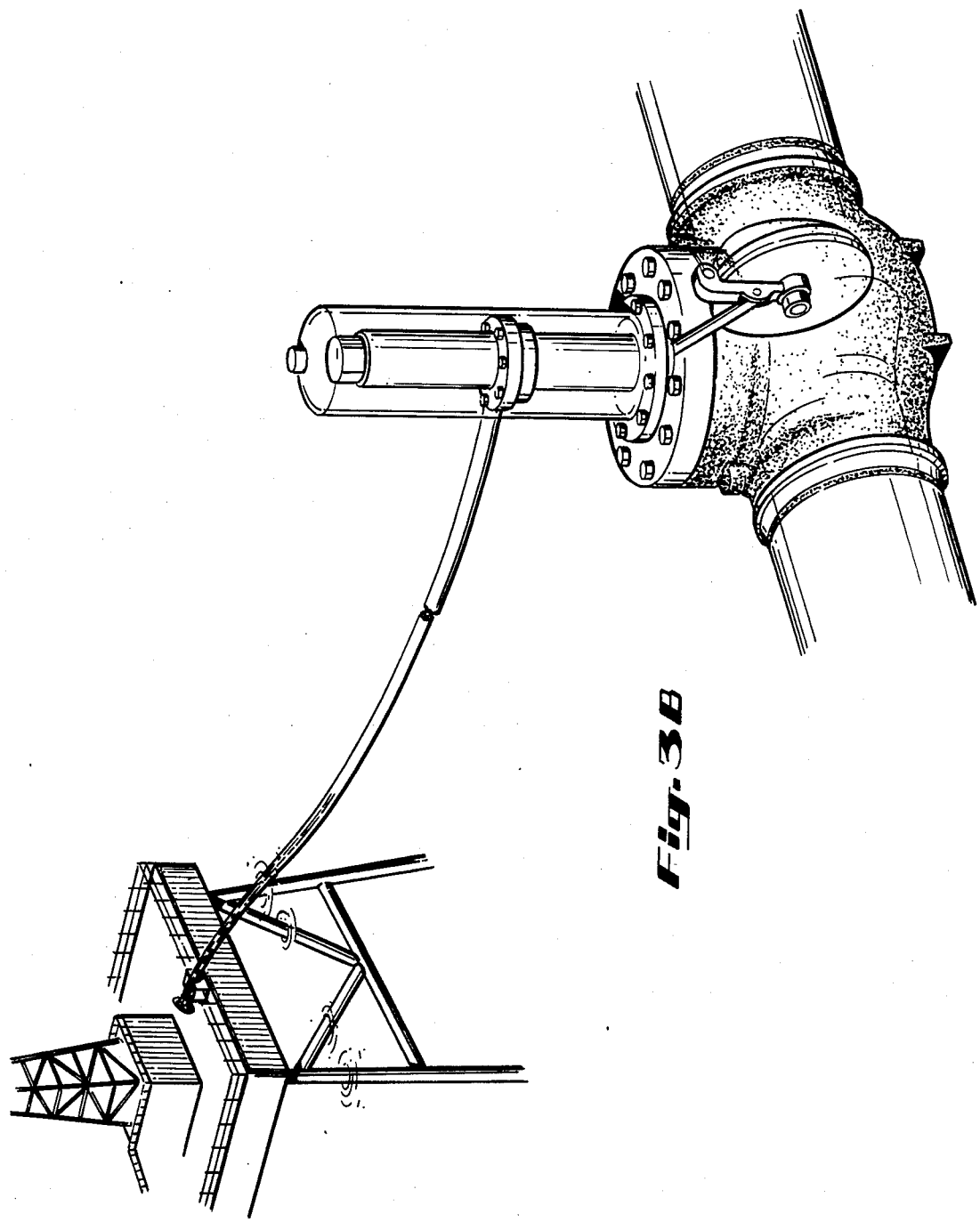

Referring next to FIG. 3a, a bleed valve 17b is mounted in series with bleed plug 17a to form control valve 17. During the bleeding operation, bleed plug 17a is opened to provide a flow path for gas to escape from cylinder 15 to the outside environment. Bleed valve 17b is then opened to allow gas to flow from cylinder 15 and out through bleed plug 17a. The combination of bleed plug 17a and bleed valve 17b, in series, provides pressure boundary redundancy and ensures that system pressure will not be lost if one valve fails open. Bleed valve 17a and bleed valve 17b may be combined when remotely located on an ocean platform and connected to check valve actuator by an umbilical line as shown in FIG. 3b, or other method well known in the art.

The present invention is used to open and close a check valve as desired. It is especially useful for maintenance operations such as pigging. The static pressure of the system should be at least 200 psia in order to provide sufficient lifting force to raise the clapper assembly. This invention will operate in any pressurized fluid system; however, it is particularly suitable for use in a gas pressurized system.

To begin raising the clapper assembly 39 with the check valve actuator, the protective cover 35 and the protective cage 37 are removed from piston cylinder 15. Bleed plug 17a and bleed valve 17b are then opened to release system gas to the outside environment.

The radial clearance between the wear rings 19 and the inner wall of lower piston cylinder 15a is sufficient to allow system gas to flow up into upper cylinder section 15b and to allow clapper assembly 39 to close due to the force of gravity when the pressure differential across lower piston section 11a is near zero. The flow rate of gas from upper cylinder section 15b out through control valve 17 is higher than the flow rate of gas past wear rings 19 into upper cylinder section 15b because the radial clearance around upper piston section 11b is greater than the radial clearance around lower piston section 11a. This difference in gas flow rates results in a pressure reduction in upper cylinder section 15b when control valve 17 is open.

The pressure reduction in upper cylinder section 15b causes a pressure differential across lower piston section 11a. The differential pressure across lower piston section 11a acts upon the effective surface area of lower piston section 11a to produce a lifting force capable of driving piston 11 upward and thereby raising clapper assembly 39.

Fluid dampening is inherent in this design in that fluid is trapped above piston 11 and must bleed past piston 11 during the upward stroke. Likewise, downward motion is dampened because downward piston movement creates a low pressure condition above piston 11.

A spring 31 may be vertically mounted in the top of upper piston cylinder section 15b to provide positive return force to the piston. As the upward stroke of piston 11 begins, piston motion and position can be ascertained by peering through sight glasses 28 and 29 with the aid of a flashlight and a reflective target. When clapper assembly 39 is in the fully opened position, piston 11 will be visible through upper sight glass 29.

The raised clapped assembly 39 can be locked into position by inserting latching stem 27. When clapper assembly 39 is fully raised, latching stem 27 will be aligned with horizontal hole 24 in upper piston cylinder section 11b. During this time the pigging operation can be performed.

Clapper assembly 39 can be returned to normal operation by removing latching stem 27 and closing control valve 17. When control valve 17 is closed, system pressure will continue to drive gas up past wear rings 19 into upper piston cylinder section 15b until the differential pressure across lower piston section 11a and upper piston section 11b is reduced to zero. As the differential pressure across piston sections 11a and 11b decreases, clapper assembly 39 begins to swing closed due to the force of gravity.

When the pigging operation is completed and the check valve no longer needs to be opened, the protective cage 37 and the protective cover 35 are remounted on piston cylinder 15.

The present invention can also be used to manually open the clapper assembly 39. This mode of use, for example, may be desirable when sufficient system pressure to raise clapper assembly 39 is unavailable. In this case, protective cover 35, protective cage 37, and actuator cap 33 are first removed in order to expose piston 11. Stem latch 27 should also be in the retracted position.

A variety of lifting assemblies, widely known in the art, can then be inserted into piston cylinder 15 and latched on to piston 11. One such lifting assembly, comprises a set of tongs which can be inserted into hole 22 in upper piston section 11b. The tongs can then be expanded and raised, thus engaging and raising piston 11 and clapper assembly 39 to the desired position. When the desired position is reached, latching stem 27 can be inserted to engage upper piston section 11b, thereby latching the clapper assembly 39 open.

In an alternative lifting assembly, the top surface of upper piston section 11b can be provided with a female thread to engage a threaded latching bolt. The bolt can be screwed into the end of upper piston section 11b to provide a means for raising piston 11.

Clapper assembly 39 can be positioned for installation into the pipeline check valve housing 10 by inserting latching stem 27 into hole 23 in piston 11.

Many modifications and variations may be made in the embodiment described herein and depicted in the accompanying drawings without departing from the concept of the present invention. Accordingly, it is clearly understood that the embodiment described and illustrated herein is illustrative only and is not intended as a limitation upon the scope of the present invention.

What is claimed is:

1. A check valve actuator apparatus for opening and closing a clapper-type check valve assembly in a pressurized gas system, comprising:
   a piston vertically mounted above said check valve;
   a linkage connecting said piston to said check valve;
   a cylinder enclosing said piston with sufficient clearance for gas to leak between said piston and said cylinder; and
   a control valve connected to said cylinder above said piston to relieve pressure within said cylinder.

2. The apparatus of claim 1 wherein said piston within said cylinder, comprises:
   a lower piston section; and
   an upper piston section having a diameter less than that of said lower piston section.

3. The apparatus of claim 2 wherein said lower piston section includes:

a multiplicity of axially spaced wear rings mounted on said lower piston section; and the lower end of said lower piston section is pivotally attached to said linkage.

4. The apparatus of claim 3 wherein said lower cylinder section has an inner diameter slightly greater than the outer diameter of said wear rings and said lower piston section.

5. The apparatus of claim 3 wherein said wear rings contain bleed slots.

6. The apparatus of claim 2 wherein said upper piston section contains three axially spaced horizontal holes traversing the diameter of said upper piston section.

7. The apparatus of claim 1 wherein said linkage is a nonrigid mechanism.

8. The apparatus of claim 1 wherein said linkage is a connecting rod.

9. The apparatus of claim 1 wherein said piston cylinder, comprises:

a lower cylinder section; and an upper cylinder section.

10. The apparatus of claim 9 wherein said upper cylinder section, comprises:

a horizontally mounted latching stem housing;

a latching stem horizontally mounted inside said stem housing; and a means for ascertaining the position of said piston within said cylinder.

11. The apparatus of claim 10 wherein said means of ascertaining the position of said piston within said cylinder is a multiplicity of axially spaced sight glasses mounted in holes in said cylinder.

12. The apparatus of claim 1 wherein said control valve is horizontally mounted in the side of said piston cylinder.

13. The apparatus of claim 12 wherein said control valve, comprises:

a bleed plug; and a bleed valve mounted in series with said bleed plug.

14. The apparatus of claim 12 further comprising:

an actuator cap inserted in the top of said cylinder; and a protective pressure cover mounted over said piston cylinder.

15. The apparatus of claim 14 further comprising a protective cage mounted over said upper cylinder section and housed within said protective cover.

16. The apparatus of claim 1 wherein said control valve is remotely actuatable.

17. The apparatus of claim 1 wherein said control valve is remotely located from said cylinder.

18. The apparatus of claim 1 wherein said control valve is mounted in said cylinder.

19. The apparatus of claim 1 further comprising a spring vertically mounted in the top of said piston cylinder.

20. A check valve for use in a gas-pressured pipeline comprising:

a clapper-type closure member pivotally suspended within said check valve;

a vertically disposed piston/cylinder assembly mounted above said check valve with sufficient clearance between said piston and said cylinder to enable said piston to move downward within said cylinder by the force of gravity, and to enable gas to pass between said piston and said cylinder;

a linkage pivotally connected at one end to the lower end of said piston and at its other end to said closure member such that upward movement of said piston will open said closure member; and a control valve connected to said cylinder above said piston operable to release pressure from said cylinder.

21. A check valve for use in a pipeline comprising:

a clapper-type check valve adapted to be connected in a pipeline and including a clapper valve and a clapper arm pivotally attached to said clapper valve;

a vertically disposed cylinder closed at its upper end and open at its lower end to communicate with pressure within said pipeline on the downstream side of said check valve;

a piston within said cylinder movably fitted within said cylinder to enable gas to leak past said piston; said piston coupled to said clapper-type check valve to move between a first low position within said cylinder when said check valve is closed and a second, high position when said check valve is open; and a control valve connected to said cylinder above said piston operable to vent pressure from said cylinder.

* * * * *